Patented Mar. 3, 1936

2,032,471

UNITED STATES PATENT OFFICE 2,032,471

PROCESS OF VULCANIZING RUBBER TO LEATHER

Leon B. Conant, Chicago, Ill.

No Drawing. Application August 10, 1934, Serial No. 739,267

4 Claims. (Cl. 18—59)

This invention relates to an improvement in the heat treatment of cemented leather, having application, particularly, to the use of elevated or vulcanizing temperatures upon the cement coat covering the leather surface designed to engage and unite with the rubber composition during vulcanization with heat and pressure. The purpose of this invention is to promote the viscosity or tackiness of the cement coat by the application of heat to the cemented leather, prior to the vulcanization, whereby, the period of its pre-heating is extended beyond the time necessary to complete the adaptation of the fibrous leather structure for hot vulcanization with pressure and thereby effect the utmost pre-vulcanization viscosity of the cement coat, and, hence, increase its ability to combine with and become an integral part of the rubber.

In the specification comprising U. S. Patents numbered 1,787,145 and 1,934,038, issued respectively December 30, 1930, and November 7, 1933, I described, both the vulcanization with heat and pressure of rubber composition to preheated, cement coated leather, as well as the value of covering the hot cemented leather with a porous pad, whereby, in the event of carelessness in handling the leather, its adaptability for vulcanization with heat and pressure still obtains by reason of the hot porous pad acting as an absorbent of the hydro-static water vaporized upon the initiation of hot vulcanization, and thereby, maintaining the quality of the leather.

In the course of research, I have been obliged to develop several formulas of cement adapted to work efficiently with numerous compounds of unvulcanized rubber composition during combination with leather by vulcanization with heat and pressure. Any cement so employed should be adapted to impregnate the leather; to become viscuous during the pre-heating thereof; and to combine with and become an integral part of the rubber composition. The first two requirements are easy of accomplishment, but the third enforces the use of fillers in the rubber latex, thereby creating different formulas, each adapted, broadly, to cooperate effectively with a variety of rubber compounds. Rubber latex, alone, is not workable, because of its extreme elasticity; any cement employed by me must have some filler, and the percentage and kinds thereof must adapt the resulting cement to the class of rubber compound with which it must work during the vulcanization. Moreover, any filler used in my formulas of cement acts to retard the creation of a viscuous circumstance to the cement coat upon the leather during its preheating, and, therefore, it frequently becomes necessary to extend the preheating period beyond the time needed to bring the fibrous leather structure to complete adaptability for vulcanization with heat and pressure in order to accomplish suitable viscosity of the cement coat. As an example, a live rubber composition compared to one loaded with other materials, usually, requires a cement which includes a very substantial amount of filler, and hence a protracted pre-heating follows, frequently, as much as an hour and a half or more, in order to produce the utmost pre-vulcanization viscosity therefore.

Accordingly, this improvement in processing provides for an extended pre-heating of the cement coated leather beyond that required to adapt its fibrous structure to vulcanization with heat and pressure and, whereby, the cement coating the leather acquires, approximate, maximum pre-vulcanization viscosity that it may combine with and become an integral part of the rubber composition in engagement therewith during the vulcanization. In making my improved process of vulcanizing rubber to leather effective, I determine the general character of the rubber composition and employ a cement to suit, with which I coat the leather, and, having allowed the same to dry, I introduce the cemented leather to the pre-heating operation whereby its body-temperature becomes elevated to an approximation of the heat of vulcanization. Then, in order to promote the viscosity of the cement coat, I extend the period of its pre-heating with the leather until the hot, cemented surface has become as viscuous as possible. Whereupon, I assemble the rubber composition therewith and, preferably, covering the exposed surface of the leather with a rubberized-canvas cushion, I now unite and vulcanize the rubber composition to the hot, viscuous cement coating the leather. Upon the conclusion of the vulcanization, the parts are removed from the press, when an examination will disclose that the rubber and leather are securely united together.

In my co-pending application Serial No. 739,268 filed August 10, 1934, likewise entitled Process of vulcanizing rubber to leather and filed herewith, I describe the value of employing a rubberized canvas cushion to cover the leather. It is understood that, the greater the viscosity of the cemented leather surface, the more readily the friction of the rubber composition extruding against it under pressure strips the cement therefrom. Hence, the use of the rubberized-canvas cushion, by graduating the application of pressure, acts to ease the force of the flow of the rubber composition and thereby reduces measurably any loss of cement.

To summarize, this improved process may be said to comprise the hot vulcanization with pressure of rubber composition to heated leather covered with hot viscuous cement adapted to combine with and become an integral part of the rubber composition during vulcanization.

I claim:

1. The process consisting in hot vulcanizing rubber composition to leather heated to adaptation therefor and coated with hot, viscuous, latex composition cement.

2. The process consisting in vulcanizing with heat and pressure rubber composition to heated leather coated with hot, viscuous, latex composition cement.

3. The process consisting in hot vulcanizing with pressure rubber composition to heated leather coated with hot, viscuous latex composition cement.

4. The process consisting in vulcanizing with heat and pressure rubber composition to heated leather coated with hot, viscuous latex composition cement adapted to unite with and become an integral part of the rubber composition during the vulcanization.

LEON B. CONANT.